(12) United States Patent
Nagashima

(10) Patent No.: US 8,548,806 B2
(45) Date of Patent: Oct. 1, 2013

(54) VOICE RECOGNITION DEVICE, VOICE RECOGNITION METHOD, AND VOICE RECOGNITION PROGRAM

(75) Inventor: Hisayuki Nagashima, Wako (JP)

(73) Assignee: Honda Motor Co. Ltd., Tokyo (JP)

( * ) Notice: Subject to any disclaimer, the term of this patent is extended or adjusted under 35 U.S.C. 154(b) by 1340 days.

(21) Appl. No.: 11/898,234

(22) Filed: Sep. 11, 2007

(65) Prior Publication Data

US 2008/0071536 A1 Mar. 20, 2008

(30) Foreign Application Priority Data

Sep. 15, 2006 (JP) ................................. 2006-251540

(51) Int. Cl.
- *G10L 15/26* (2006.01)
- *G10L 15/00* (2013.01)
- *G10L 15/04* (2013.01)
- *G10L 15/14* (2006.01)

(52) U.S. Cl.
USPC ........... 704/251; 704/235; 704/238; 704/252; 704/256

(58) Field of Classification Search
None
See application file for complete search history.

(56) References Cited

U.S. PATENT DOCUMENTS

| | | | | | |
|---|---|---|---|---|---|
| 4,501,012 | A | * | 2/1985 | Kishi et al. | 704/275 |
| 5,710,866 | A | * | 1/1998 | Alleva et al. | 704/256.4 |
| 5,832,430 | A | * | 11/1998 | Lleida et al. | 704/256 |
| 5,991,721 | A | * | 11/1999 | Asano et al. | 704/257 |
| 6,052,657 | A | * | 4/2000 | Yamron et al. | 704/9 |
| 6,108,628 | A | * | 8/2000 | Komori et al. | 704/256 |
| 6,336,108 | B1 | * | 1/2002 | Thiesson et al. | 706/20 |
| 6,839,669 | B1 | * | 1/2005 | Gould et al. | 704/246 |
| 6,985,862 | B2 | * | 1/2006 | Strom et al. | 704/255 |
| 6,999,874 | B2 | * | 2/2006 | Seto et al. | 701/211 |
| 7,013,277 | B2 | * | 3/2006 | Minamino et al. | 704/257 |
| 7,170,400 | B2 | * | 1/2007 | Cowelchuk et al. | 340/438 |
| 7,228,275 | B1 | * | 6/2007 | Endo et al. | 704/235 |
| 7,263,487 | B2 | * | 8/2007 | Hwang | 704/243 |
| 7,328,155 | B2 | * | 2/2008 | Endo et al. | 704/251 |
| 7,383,172 | B1 | * | 6/2008 | Jamieson | 704/9 |
| 7,395,205 | B2 | * | 7/2008 | Franz et al. | 704/256.3 |
| 7,499,892 | B2 | * | 3/2009 | Aoyama et al. | 706/16 |
| 7,881,935 | B2 | * | 2/2011 | Asano et al. | 704/252 |
| 2002/0111806 | A1 | * | 8/2002 | Franz et al. | 704/255 |
| 2003/0023437 | A1 | * | 1/2003 | Fung | 704/236 |

(Continued)

FOREIGN PATENT DOCUMENTS

JP 2001-034292 2/2001

*Primary Examiner* — Pierre-Louis Desir
*Assistant Examiner* — Matthew Baker
(74) *Attorney, Agent, or Firm* — Arent Fox LLP

(57) ABSTRACT

A voice recognition device, a voice recognition method and a voice recognition program capable of appropriately restricting recognition objects based on voice input from a user to recognize the input voice with accuracy are provided. The voice recognition device includes a first voice recognition processing unit for executing processing of assigning weights of a first ratio to a sound score and a language score calculated for the input voice and recognizing the voice using the obtained scores to determine a type of a domain representing the control object based on a result of the processing, and a second voice recognition processing unit, using the domain of the determined type as a recognition object, for executing processing of assigning weights of a second ratio to the sound score and the language score calculated for the input voice, the weight on the sound score being greater in the second ratio than in the first ratio, and recognizing the voice using the obtained scores to determine the control content of the control object based on a result of the processing.

6 Claims, 11 Drawing Sheets

(56) References Cited

U.S. PATENT DOCUMENTS

| | | | |
|---|---|---|---|
| 2003/0050778 A1* | 3/2003 | Nguyen et al. | 704/235 |
| 2003/0236664 A1* | 12/2003 | Sharma | 704/251 |
| 2004/0143440 A1* | 7/2004 | Prasad et al. | 704/270 |
| 2005/0080632 A1* | 4/2005 | Endo et al. | 704/277 |
| 2005/0125110 A1* | 6/2005 | Potter et al. | 701/1 |
| 2005/0131699 A1* | 6/2005 | Fukada | 704/270 |
| 2005/0288929 A1* | 12/2005 | Kuboyama et al. | 704/251 |
| 2006/0195321 A1* | 8/2006 | Deligne et al. | 704/257 |
| 2007/0100618 A1* | 5/2007 | Lee et al. | 704/238 |
| 2008/0004877 A1* | 1/2008 | Tian | 704/251 |
| 2008/0071536 A1* | 3/2008 | Nagashima | 704/246 |
| 2011/0029311 A1* | 2/2011 | Minamino et al. | 704/243 |

* cited by examiner

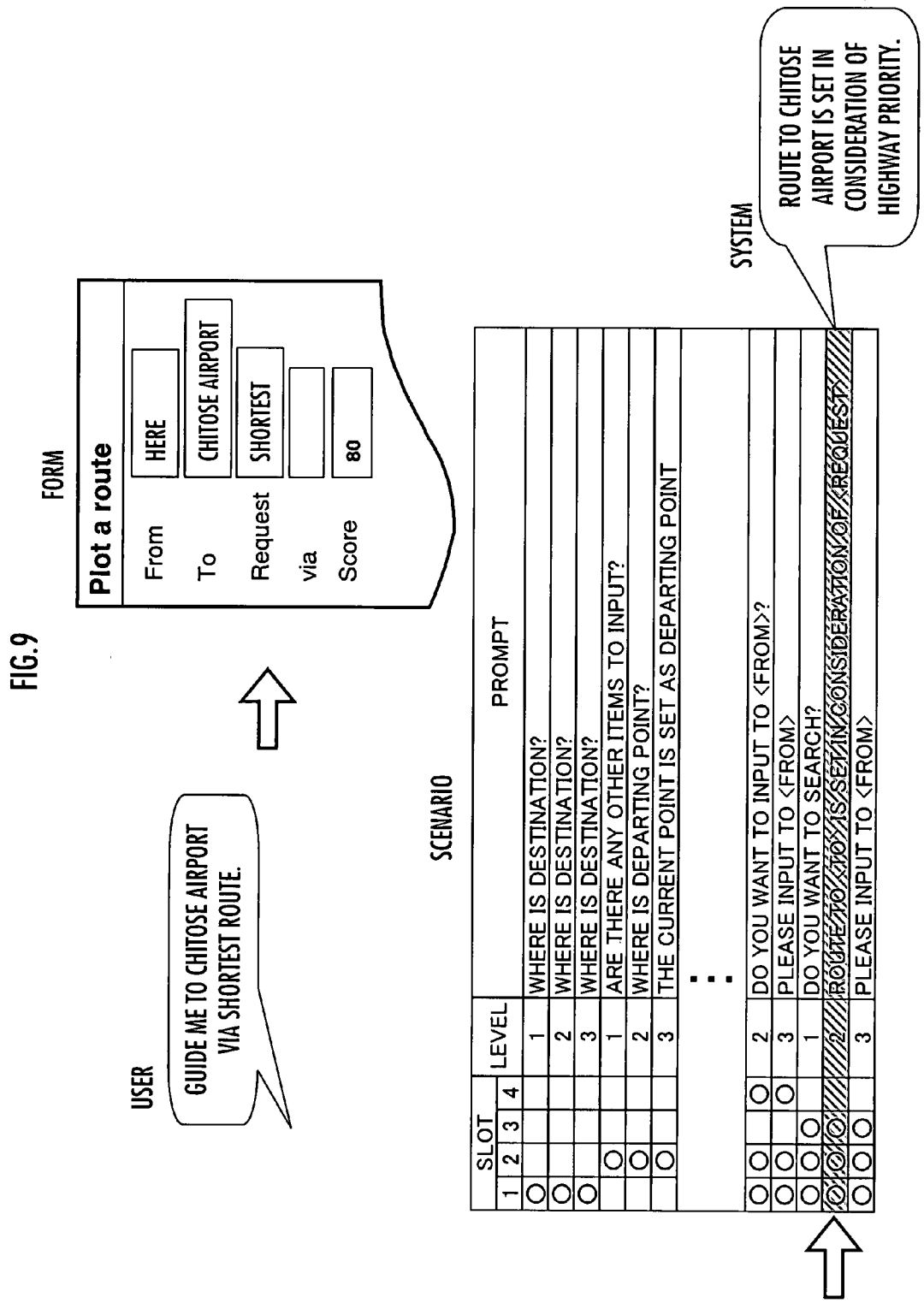

| Uni-gram | set | the | station | nearly | ninth | place |
|---|---|---|---|---|---|---|
| Audio | 0.1 | 0.05 | 0.3 | 0.08 | 0.09 | 0.01 |
| Climate | 0.05 | 0.03 | 0 | 0 | 0.04 | 0 |
| Navigation | 0.08 | 0.1 | 0.2 | 0.1 | 0.08 | 0.2 |
| Ambiguous | 0.02 | 0.08 | 0.01 | 0.01 | 0.1 | 0 |

(b)

| Bi-gram | set the | the station | station nearly | nearly ninth | ninth place |
|---|---|---|---|---|---|
| Audio | 0.1 | 0.2 | 0.18 | 0.08 | 0 |
| Climate | 0.07 | 0 | 0 | 0.01 | 0 |
| Navigation | 0.08 | 0.15 | 0.2 | 0.1 | 0.1 |
| Ambiguous | 0.01 | 0 | 0 | 0 | 0 |

(c)

| Tri-gram | set the station | the station nearly | station nearly ninth | nearly ninth place |
|---|---|---|---|---|
| Audio | 0.8 | 0.2 | 0.8 | 0 |
| Climate | 0 | 0 | 0 | 0 |
| Navigation | 0.7 | 0.3 | 0.1 | 0.1 |
| Ambiguous | 0 | 0 | 0 | 0 |

(d)

| Total | Score |
|---|---|
| Audio | 2.99 |
| Climate | 0.2 |
| Navigation | 2.59 |
| Ambiguous | 0.23 |

FIG.11

(a)
| Uni-gram | set | the | station | nearly | ninth | place |
|---|---|---|---|---|---|---|
| Audio | 0.1 | | 0.3 | | | |
| Climate | | | | | | |
| Navigation | | 0.1 | | 0.1 | | 0.2 |
| Ambiguous | | | | | 0.1 | |

(b)
| Bi-gram | set the | the station | station nearly | nearly ninth | ninth place |
|---|---|---|---|---|---|
| Audio | 0.1 | 0.2 | | | |
| Climate | | | | | |
| Navigation | | | 0.2 | 0.1 | 0.1 |
| Ambiguous | | | | | |

(c)
| Tri-gram | set the station | the station nearly | station nearly ninth | nearly ninth place |
|---|---|---|---|---|
| Audio | 0.8 | | | |
| Climate | | | | |
| Navigation | | 0.3 | 0.1 | 0.1 |
| Ambiguous | | | | |

(d)
| Total | Score |
|---|---|
| Audio | 1.5 |
| Climate | 0 |
| Navigation | 1.3 |
| Ambiguous | 0.1 |

VOICE RECOGNITION DEVICE, VOICE RECOGNITION METHOD, AND VOICE RECOGNITION PROGRAM

BACKGROUND OF THE INVENTION

1. Field of the Invention

The present invention relates to a voice recognition device, a voice recognition method, and a voice recognition program that recognize voice input from a user to obtain information for controlling an object based on the recognition result.

2. Description of the Related Art

In recent years, for example in a system in which a user operates an apparatus and the like, a voice recognition device is used which recognizes voice input from the user to obtain information necessary for operation of the apparatus and the like. In such a voice recognition device, when it recognizes the voice (speech) input from the user, it responds to the user based on the recognition result to prompt next speech of the user, for interaction with the user. Then, it obtains the information necessary for operation of the apparatus and the like from the result of recognition of the interaction with the user. At this time, for example a recognition dictionary having word entries as recognition objects registered in advance is used to recognize the voice by comparing the acoustic feature of the input voice with the acoustic features of the word entries registered in the recognition dictionary.

The voice recognition device is mounted to a vehicle, for example, and a plurality of apparatuses mounted to the vehicle, such as an audio system, a navigation system, an air conditioner and the like, are operated by the user. These apparatuses are advanced in function; for example, the navigation system is provided with a plurality of functions including "map display", "POI (Point of Interest) search", and others, which functions are operated by the user. When there are such a large number of control objects, however, the number of word entries for operating the control objects increases inevitably. The increase of the word entries to be recognized leads to an increase of the case where the acoustic features of the word entries are similar to each other, which may increase the possibility of recognition error. As such, there has been proposed a technology to perform voice recognition processing by restricting the recognition dictionary to be used in accordance with the input voice, to improve the recognition accuracy (see, e.g., Japanese Patent Laid-Open No. 2001-034292 (hereinafter, referred to as "Patent Document 1")).

In the voice recognition device (word sequence recognition device) of Patent Document 1, the input voice is compared with the recognition dictionary data to carry out first-time voice recognition processing to recognize and extract a keyword (a word having a prescribed attribute). Then, in the voice recognition device, a topic is confirmed based on the extracted keyword, and the recognition dictionary data is reconstructed to have the word entries restricted based on the confirmed topic, and second-time voice recognition processing is carried out based on this reconstructed recognition dictionary data, to recognize another word. Further, in the voice recognition device, the processing of reconstructing the recognition dictionary data based on the topic confirmed from the recognized word to thereby recognize another word, as described above, is repeated a required number of times to carry out a multi-stage processing, to recognize the voice input from the user.

With the above-described voice recognition device, however, the recognition dictionary data is not restricted in the first-time voice recognition processing, which means that there would be many word entries having similar acoustic features, leading to a high possibility of recognition error. If the keyword extracted from the input voice in the first-time voice recognition processing is a result of such erroneous recognition, the topic confirmed based on the extracted keyword would considerably deviate from the actual topic. When the second-time voice recognition processing is carried out based on the recognition dictionary data reconstructed to be restricted to the word entries not even close to the actual topic, the word entries matching the user's speech would not be recognized, hindering correct recognition of the user's speech. Furthermore, the voice recognition device carries out the second-time and subsequent voice recognition processing in a manner similar to that of the first-time voice recognition processing, and the features of the input voice are grasped in a similar manner in each processing. Thus, even if a correct keyword is extracted in the first-time voice recognition processing and the recognition dictionary data is reconstructed appropriately, the possibility of recognition error in the reconstructed recognition dictionary data is not eliminated, and thus, it is still highly likely that a correct recognition result may not be reached.

SUMMARY OF THE INVENTION

In view of the foregoing, an object of the present invention is to provide a voice recognition device, a voice recognition method and a voice recognition program that can appropriately restrict recognition objects based on the voice input from a user to recognize the input voice with accuracy.

According to a first aspect of the present invention, there is provided a voice recognition device for determining a control content of a control object based on a recognition result of input voice, which includes: a first voice recognition processing unit for executing processing on the input voice by assigning weights of a first ratio to a sound score calculated based on an acoustic feature of the voice and a language score calculated based on a linguistic feature of the voice, and recognizing the voice using the obtained scores, to determine a type of a domain representing the control object based on a result of the processing; and a second voice recognition processing unit for executing processing, using the domain of the type determined by the first voice recognition processing unit as a recognition object, by assigning weights of a second ratio to the sound score and the language score calculated for the input voice, the weight on the sound score being greater in the second ratio than in the first ratio, and recognizing the voice using the obtained scores, to determine the control content of the control object based on a result of the processing (first invention).

In the voice recognition device of the first invention, in the processing of recognizing the voice by the first voice recognition processing unit, the recognition objects are not restricted, and they are considered to include a large number of word entries having similar acoustic features. The first voice recognition processing unit assigns weights to the sound score and the language score with a first ratio. It is noted that the "score" refers to an index that indicates probability (likelihood, confidence factor) that the word or word sequence as a candidate of the recognition result of the input voice matches the input voice, from the acoustic, linguistic, and various other standpoints. The "language score" is calculated based, e.g., on the appearance probability of a respective word or word sequence, and by using the language score, the processing of recognizing the voice is carried out in consideration of the linguistic feature. That is, the speech is dictated as a text expressed in a word sequence, and the meaning of the speech is understood in consideration of the context of the text (sentence). The recognition result obtained in this manner shows general tendency of the user's speech, reflecting the user's intention. Thus, the domain type indicating the control object is determined with accuracy based on the recognition result. It is noted that the "domain" refers to classification according to a category of the recognition object, and specifically indicates the apparatus or function as a control object.

In the processing of recognizing the voice by the second voice recognition processing unit, the voice recognition processing is carried out with the recognition objects being restricted to the domain type thus determined. When the control contents have the same apparatus or function as the control objects, they may include somewhat similar expressions. In this regard, the second voice recognition processing unit assigns weights to the sound score and the language score with a second ratio in which the weight on the sound score is greater than in the first ratio, to carry out the voice recognition processing using the obtained scores. Accordingly, it is possible to determine the recognition result in consideration in detail of the acoustic feature of the word or the word sequence as the candidate of the recognition result of the input voice. This ensures accurate determination of the recognition result even if there are, e.g., somewhat similar expressions in the same domain.

As described above, according to this voice recognition device, it is possible to determine the domain type with accuracy and restrict the recognition objects as appropriate, and also possible to determine the recognition result in consideration in detail of the acoustic feature for the restricted recognition objects, and therefore, the input voice can be recognized with accuracy.

In the voice recognition device of the first invention, it is preferable that the first voice recognition processing unit and the second voice recognition processing unit execute the processing of recognizing the voice with respect to the same voice (second invention).

In this case, the processing of recognizing the voice is carried out by the first voice recognition processing unit for the input voice to determine the domain type, and the processing of recognizing the voice is carried out by the second voice recognition processing unit for the same voice, targeting the determined domain type. Accordingly, it is possible to efficiently recognize the input voice from one-time input from the user.

Further, it is preferable that the voice recognition device of the first or second invention includes a control processing unit for executing prescribed control processing based at least on the control content of the control object determined (third invention).

In this case, the control processing unit determines and executes prescribed control processing from among, e.g., a plurality of predetermined control processing (scenarios), in accordance with the recognition result of the input voice. The prescribed control processing may be, e.g., processing of controlling an apparatus or function as a control object based on information obtained from the input voice, processing of controlling a response to the user by voice or image display, and the like. According to the present invention, the voice input from the user is recognized with accuracy, so that it is possible to appropriately determine and carry out the prescribed control processing in accordance with the user's intention.

It is noted that the control processing unit may determine and carry out the prescribed control processing in consideration of the state of the system (for example a vehicle) on which the voice recognition device is mounted, the state of the user, and the state of the apparatus or function as the control object, in addition to the recognition result of the input voice. Alternatively, the voice recognition device may be provided with a storage unit for storing an interaction history of the user, a change in state of the apparatus and the like, in which case the control processing unit may determine the prescribed control processing in consideration of the interaction history and/or the change in state, in addition to the recognition result of the speech.

Further, it is preferable that the voice recognition device of the third invention includes a response output processing unit for outputting a response to a user from which the voice is input, and that the control processing executed by the control processing unit includes processing of controlling the response to the user to prompt the user to input voice (fourth invention).

In this case, for example if the information for controlling the object is not obtained sufficiently from the voice input from the user, the control processing unit controls the response output from the response output processing unit so as to prompt the user to input necessary information. This causes interaction with the user, and the information necessary for controlling the object is obtained from the result of recognition of the interaction with the user. According to the present invention, the voice input from the user is recognized with accuracy, and thus, it is possible to obtain the information via efficient interaction.

According to a second aspect of the present invention, there is provided a voice recognition device including a microphone to which voice is input and a computer having an interface circuit for accessing data of the voice obtained via the microphone, and determining a control content of a control object through processing executed by the computer, based on a recognition result of the voice input to the microphone, wherein the computer executes: sound score calculation processing of calculating a sound score based on an acoustic feature of the input voice; language score calculation processing of calculating a language score based on a linguistic feature of the input voice; for the input voice, first voice recognition processing of assigning weights of a first ratio to the sound score calculated in the sound score calculation processing and the language score calculated in the language score calculation processing, and recognizing the voice using the obtained scores; domain type determination processing of determining a type of a domain representing the control object based on a recognition result in the first voice recognition processing; for the input voice, second voice recognition processing, using the domain of the type determined in the domain type determination processing as a recognition object, of assigning weights of a second ratio to the sound score calculated in the sound score calculation processing and the language score calculated in the language score calculation processing, the weight on the sound score being greater in the second ratio than in the first ratio, and recognizing the voice using the obtained scores; and recognition result determination processing of determining the control content of the control object based on a recognition result in the second voice recognition processing (fifth invention).

According to the voice recognition device of the fifth invention, the advantages explained in conjunction with the voice recognition device of the first invention can be achieved through the processing of the computer.

According to the present invention, there is also provided a voice recognition method for determining a control content of a control object based on a recognition result of input voice, which includes: a first voice recognition step of assigning weights of a first ratio to a sound score calculated based on an acoustic feature of the input voice and a language score calculated based on a linguistic feature of the voice, and recognizing the voice using the obtained scores; a domain type determination step of determining a type of a domain representing the control object based on a recognition result in the first voice recognition step; a second voice recognition step, using the domain of the type determined in the domain type determination step as a recognition object, of assigning weights of a second ratio to the sound score and the language score calculated for the input voice, the weight on the sound score being greater in the second ratio than in the first ratio, and recognizing the voice using the obtained scores; and a recognition result determination step of determining the control content of the control object based on a recognition result in the second voice recognition step (sixth invention).

According to the voice recognition method of the sixth invention, as described in conjunction with the voice recognition device of the present invention, the domain type can be determined with accuracy and the recognition objects can be restricted appropriately, and the recognition result can be determined in consideration in detail of the acoustic feature for the restricted recognition objects, and accordingly, the input voice can be recognized with accuracy.

According to the present invention, there is also provided a voice recognition program causing a computer to execute processing of determining a control content of a control object based on a recognition result of input voice, which has a function to cause the computer to execute: sound score calculation processing of calculating a sound score based on an acoustic feature of the input voice; language score calculation processing of calculating a language score based on a linguistic feature of the input voice; for the input voice, first voice recognition processing of assigning weights of a first ratio to the sound score calculated in the sound score calculation processing and the language score calculated in the language score calculation processing, and recognizing the voice using the obtained scores; domain type determination processing of determining a type of a domain representing the control object based on a recognition result in the first voice recognition processing; for the input voice, second voice recognition processing, using the domain of the type determined in the domain type determination processing as a recognition object, of assigning weights of a second ratio to the sound score calculated in the sound score calculation processing and the language score calculated in the language score calculation processing, the weight on the sound score being greater in the second ratio than in the first ratio, and recognizing the voice using the obtained scores; and recognition result determination processing of determining the control content of the control object based on a recognition result in the second voice recognition processing (seventh invention).

In this case, it is possible to cause the computer to execute the processing that can achieve the advantages explained in conjunction with the voice recognition device of the first invention.

BRIEF DESCRIPTION OF THE DRAWINGS

FIG. 9 is a diagram illustrating the processing of determining a scenario in the voice interaction processing in FIG. 3.

FIG. 10 is a diagram illustrating processing of determining a domain in the voice interaction processing in FIG. 3.

FIG. 11 is a diagram illustrating processing of determining a domain in voice interaction processing according to a second embodiment of the present invention.

DESCRIPTION OF THE PREFERRED EMBODIMENTS

First Embodiment

First, a first embodiment of the present invention will be described with reference to FIG. 1 to FIG. 10.

Figure 1:
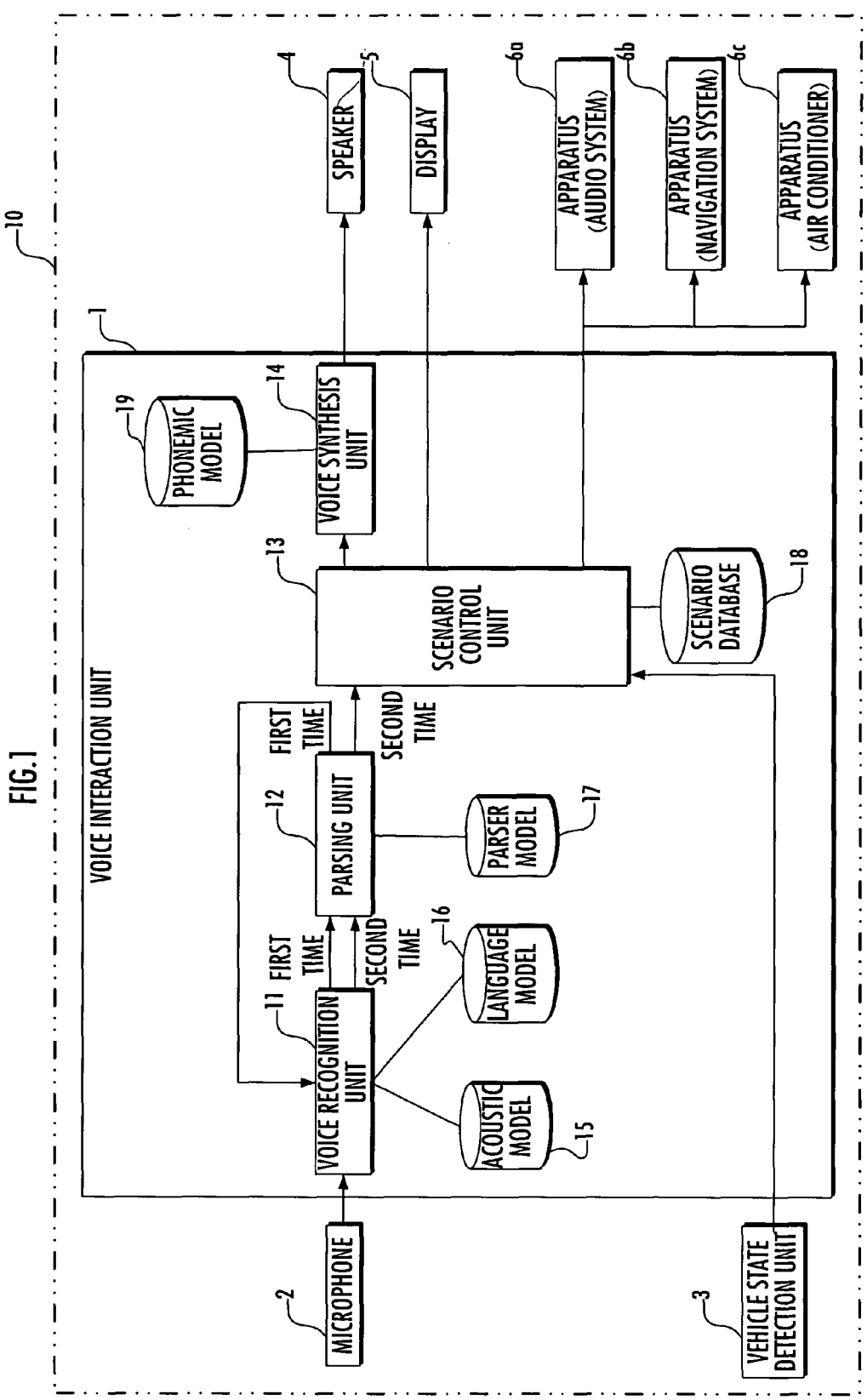
FIG. 1 is a functional block diagram of a voice recognition device according to a first embodiment of the present invention.

Referring to FIG. 1, the voice recognition device of the present invention is composed of a voice interaction unit 1, and is mounted to a vehicle 10. The voice interaction unit 1 is connected with a microphone 2 to which speech of a driver of the vehicle 10 is input, and a vehicle state detection unit 3 that detects a state of the vehicle 10. The voice interaction unit 1 is also connected with a speaker 4 that outputs a response to the driver, and a display 5 that provides display for the driver. The voice interaction unit 1 is also connected with a plurality of apparatuses 6a-6c that can be operated by the driver with voice and the like.

The microphone 2, to which voice of the driver of the vehicle 10 is input, is arranged in a prescribed position in the vehicle. For example when initiation of input of voice is instructed using a talk switch, the microphone 2 obtains the input voice as the speech of the driver. The talk switch is an ON/OFF switch operated by a driver of the vehicle 10, and it is depressed to turn ON to instruct initiation of input of the voice.

The vehicle state detection unit 3 corresponds to a sensor detecting a state of the vehicle 10. Herein, the state of the vehicle 10 refers, e.g., to the running condition of the vehicle 10 such as the speed, acceleration and deceleration, driving environment information such as the position and running road of the vehicle 10, the operating state of an apparatus (wiper, winker, navigation system 6a, audio system 6b or the like) mounted to the vehicle 10, or the state within the vehicle such as the in-vehicle temperature of the vehicle 10. For example, the sensor detecting the running condition of the vehicle 10 may be a vehicle speed sensor detecting the running speed of the vehicle 10 (vehicle speed), a yaw rate sensor detecting the yaw rate of the vehicle 10, or a brake sensor detecting the operation of the brake of the vehicle 10 (whether or not the brake pedal is operated). Further, as the state of the vehicle 10, the state of the driver of the vehicle 10 (perspiration on the palm of the driver, driving load or the like) may be detected.

The speaker 4 is for outputting a response (audio guide) to the driver of the vehicle 10. A speaker of the audio system 6a, which will be described later, may also serve as the speaker 4.

The display 5 may be, e.g., a head up display (HUD) displaying information such as an image on the front window of the vehicle 10, a display provided integrally to the meter displaying the running condition of the vehicle 10 such as the vehicle speed, or a display provided in the navigation system 6b, which will be described later. The display for the navigation system 6b is a touch panel having a touch switch mounted therein.

The apparatuses 6a-6c are specifically an audio system 6a, a navigation system 6b and an air conditioner 6c mounted to the vehicle 10. For each of the apparatuses 6a-6c, controllable elements (devices, contents), functions, and operations are predetermined.

For example, the audio system 6a has "CD", "MP3", "radio", "speaker" and others as its devices. The audio system 6a has "sound volume" and others as its functions, and "change", "on", "off" and others as its operations. Further, the operations of the "CD" and "MP3" include "play", "stop" and others. The functions of the "radio" include "channel selection" and others. The operations related to "sound volume" include "up", "down" and others.

The navigation system 6b has "image display", "route guidance", "POI search" and others as its contents. Further, the operations related to the "image display" include "change", "zoom in", "zoom out" and others. The "route guidance" is the function to guide the user to a destination with the audio guide and the like, and the "POI search" is the function to search for a destination such as a restaurant, hotel, or the like.

Further, the air conditioner 6c has "air volume", "preset temperature" and others as its functions. Further, the operations of the air conditioner 6c include "on", "off" and others. The operations related to the "air volume" and "preset temperature" include "change", "up", "down" and others.

These apparatuses 6a-6c are each controlled by designating the information for controlling the object (type of the apparatus or function, content of the operation, or the like). The devices, contents, and functions of each of the apparatuses 6a-6c as the control objects are categorized into a plurality of domains. The domains may be designated in a hierarchical manner; for example, the "audio" domain is classified into sub-domains of "CD" and "radio".

The voice interaction unit 1, although not shown in detail, is an electronic unit that is composed of a memory storing data of voice, and a computer (a processing circuit having a CPU, a memory, an input/output circuit and the like, or a microcomputer having those functions aggregated therein) which has an interface circuit for accessing (reading and writing) the data stored in the memory and performs various processing on the data of the voice. As the memory for storing the data of the voice, the memory in the computer or an external storage medium may be used.

An output (analog signal) of the microphone 2 is converted to a digital signal via an input circuit (A/D converter circuit or the like) before being input to the voice interaction unit 1. Based on the input data, the voice interaction unit 1 carries out processing such as: recognizing the speech input from the driver, interacting with the driver or providing information to the driver via the speaker 4 or the display 5 based on the recognition result, controlling the apparatuses 6a-6c, and the like. Such processing is implemented when a program preinstalled into the memory of the voice interaction unit 1 is executed by the voice interaction unit 1. The program includes the voice recognition program of the present invention. It is noted that the program may be stored in the memory via a recording medium such as a CD-ROM or the like, or may be distributed or broadcast from an external server via a network or satellite and received by a communication apparatus mounted to the vehicle 10 and then stored in the memory.

More specifically, the voice interaction unit 1 includes, as the functions implemented by the above program, a voice recognition unit 11 that uses an acoustic model 15 and a language model 16 to recognize the input voice and output the same as text, and a parsing unit 12 that uses a parser model 17 to understand the meaning of the speech from the recognized text. The voice interaction unit 1 further includes a scenario control unit 13 that uses a scenario database 18 to determine a scenario based on the recognition result of the speech to respond to the driver or control the apparatus or the like, and a voice synthesis unit 14 that uses a phonemic model 19 to synthesize a voice response to be output to the driver.

Each of the acoustic model 15, the language model 16, the parser model 17, the scenario database 18, and the phonemic model 19 is a recording medium (database) such as a CD-ROM, DVD, HDD and the like having the data recorded thereon.

It is noted that the voice recognition unit 11 and the parsing unit 12 constitute the first and second voice recognition processing units of the present invention. The scenario control unit 13 constitutes the control processing unit of the present invention. Further, the scenario control unit 13 and the voice synthesis unit 14 constitute the response output processing unit of the present invention.

The voice recognition unit 11 subjects the waveform data indicating the voice of the speech input to the microphone 2 to frequency analysis, to thereby extract a feature vector. Then, the voice recognition unit 11 carries out "voice recognition processing" in which it recognizes the input voice based on the extracted feature vector and outputs the same as a text expressed by a word sequence. The voice recognition processing is carried out through comprehensive determination of the acoustic and linguistic features of the input voice, by using a probability and statistical method which will be described in the following.

Specifically, the voice recognition unit 11 firstly uses the acoustic model 15 to evaluate the likelihood of each phonetic data according to the extracted feature vector (hereinafter, this likelihood will be referred to as "sound score" where appropriate), to determine the phonetic data based on the sound score. Further, the voice recognition unit 11 uses the language model 16 to evaluate the likelihood of each text expressed in a word sequence according to the determined phonetic data (hereinafter, this likelihood will be referred to as "language score" where appropriate), to determine the text(s) based on the language score. Furthermore, the voice recognition unit 11 calculates a confidence factor of voice recognition for every one of the determined texts based on the sound score and the language score of the text (hereinafter, this confidence factor will be referred to as "voice recognition score" where appropriate). The voice recognition unit 11 then outputs any text expressed by the word sequence having the voice recognition score fulfilling a prescribed condition as a "recognized text".

When a domain type has been determined by the parsing unit 12 as will be described later, the voice recognition unit 11 performs the voice recognition processing using only a part (effective part) of the data of the language model 16 that is categorized into the domain of the determined type.

The parsing unit 12 carries out "parsing processing" in which it uses the parser model 17 to understand the meaning of the input speech from the text recognized by the voice recognition unit 11. This parsing processing is carried out by analyzing the relation between the words (syntax) in the text recognized by the voice recognition unit 11, by using a probability and statistical method as will be described in the following.

Specifically, the parsing unit 12 evaluates the likelihood of the recognized text (hereinafter, this likelihood will be referred to as "parsing score" where appropriate), and determines a text categorized into the class corresponding to the meaning of the recognized text, based on the parsing score. The parsing unit 12 then outputs the "categorized text" having the parsing score fulfilling a prescribed condition as a recognition result of the input speech, together with the parsing score. The "class" is the classification according to the category representing the control object or the control content, like the domain described above. For example, when the recognized text is "change of setting", "change the setting", "modify the setting", or "setting change", the categorized text becomes {Setup} for any of them. Further, the parsing unit 12 determines and outputs the domain type of the input speech based on the parsing score.

The scenario control unit 13 uses the data recorded on the scenario database 18 to determine a scenario for the response output to the driver or the apparatus control, based at least on the recognition result output from the parsing unit 12 and the state of the vehicle 10 obtained from the vehicle state detection unit 3. The scenario database 18 has a plurality of scenarios for the response output or the apparatus control recorded in advance together with the conditions on the recognition result of the speech or the state of the vehicle. The scenario control unit 13 carries out the processing of controlling a response by voice or image display, and the processing of controlling the apparatuses, according to the determined scenario. More specifically, for the response by voice for example, the scenario control unit 13 determines the content of the response to be output (a response sentence for prompting next speech of the driver, a response sentence for informing the user of completion of an operation and the like), and the speed and sound volume upon output of the response.

The voice synthesis unit 14 synthesizes voice using the phonemic model 19 in accordance with the response sentence determined in the scenario control unit 13, and outputs it as the waveform data indicating the voice. The voice is synthesized using the processing of TTS (Text to Speech), for example. More specifically, the voice synthesis unit 14 normalizes the text of the response sentence determined by the scenario control unit 13 to an expression suitable for the voice output, and converts each word in the normalized text into phonetic data. The voice synthesis unit 14 then determines a feature vector from the phonetic data using the phonemic model 19, and performs filtering processing on the feature vector for conversion into waveform data. The waveform data is output from the speaker 4 as the voice.

The acoustic model 15 has recorded therein data indicating the probabilistic correspondence between the feature vector and the phonetic data. In detail, recorded as the data in the acoustic model 15 are a plurality of hidden Markov models (HMMs) prepared for each recognition unit (phoneme, morpheme, word and the like). The HMM is a statistical signal source model that represents the voice as a link of stationary signal sources (states), and expresses a time series as a transition probability from one state to another state. With the HMM, it is possible to express an acoustic feature of the voice changing in a time series with a simple probability model. The parameter of the HMM such as the transition probability or the like is predetermined through training by providing corresponding voice data for learning. The phonemic model 19 also has recorded therein HMMs similar to those of the acoustic model 15 for determining a feature vector from phonetic data.

The language model 16 has recorded therein data indicating an appearance probability and a connection probability of a word that is a recognition object, together with the phonetic data and the text of the word. The word as a recognition object is determined in advance as the word that would likely be used in the speech for controlling an object. The data of the appearance probability and connection probability of the word are generated statistically by analyzing a large volume of training text corpus. Further, the appearance probability of the word is calculated based, e.g., on the appearance frequency of the word in the training text corpus.

For the language model 16, a language model of N-gram is used, for example, which is expressed by a probability that a specific number N of words appear consecutively. In the present embodiment, the N-grams corresponding to the number of words included in the input speech are used as the language model 16. More specifically, the N-grams where N is not greater than the number of words included in the phonetic data are used for the language model 16. For example, in the case where the number of words included in the phonetic data is two, a uni-gram (N=1) expressed as the appearance probability of one word, and a bi-gram (N=2) expressed as the occurrence probability of a two-word sequence (i.e., the conditional appearance probability for the preceding word) are used.

Further, N-grams may be used for the language model 16 by restricting the N value to a prescribed upper limit. For the prescribed upper limit, for example, a predetermined value (for example, N=2), or a value set from point to point so that the processing time of the voice recognition processing for the input speech is within a prescribed time, may be used. For example, when the N-grams having N=2 as the upper limit are used, the uni-gram and the bi-gram are used alone, even if the number of words included in the phonetic data is greater than two. In this manner, it is possible to prevent the operation cost for the voice recognition processing from becoming too much, and thus to output a response to the speech of the driver in an appropriate response time.

The parser model 17 has recorded therein data indicating an appearance probability and a connection probability of a word as a recognition object, together with the text and class of the word. For example, the language model of N-grams may be used for the parser model 17, as in the case of the language model 16. In the present embodiment, specifically, the N-grams where N is not greater than the number of words included in the recognized text, with N=3 being the upper limit, are used for the parser model 17. That is, for the parser model 17, a uni-gram, a bi-gram, and a tri-gram (N=3) expressed as the occurrence probability of a three-word sequence (i.e., conditional appearance probability for the preceding two words) are used. It is noted that the upper limit may be arbitrarily set, which is not restricted to three. It may also be possible to set no upper limit, in which case the N-grams where N is not greater than the number of words included in the recognized text are used.

Figure 2:
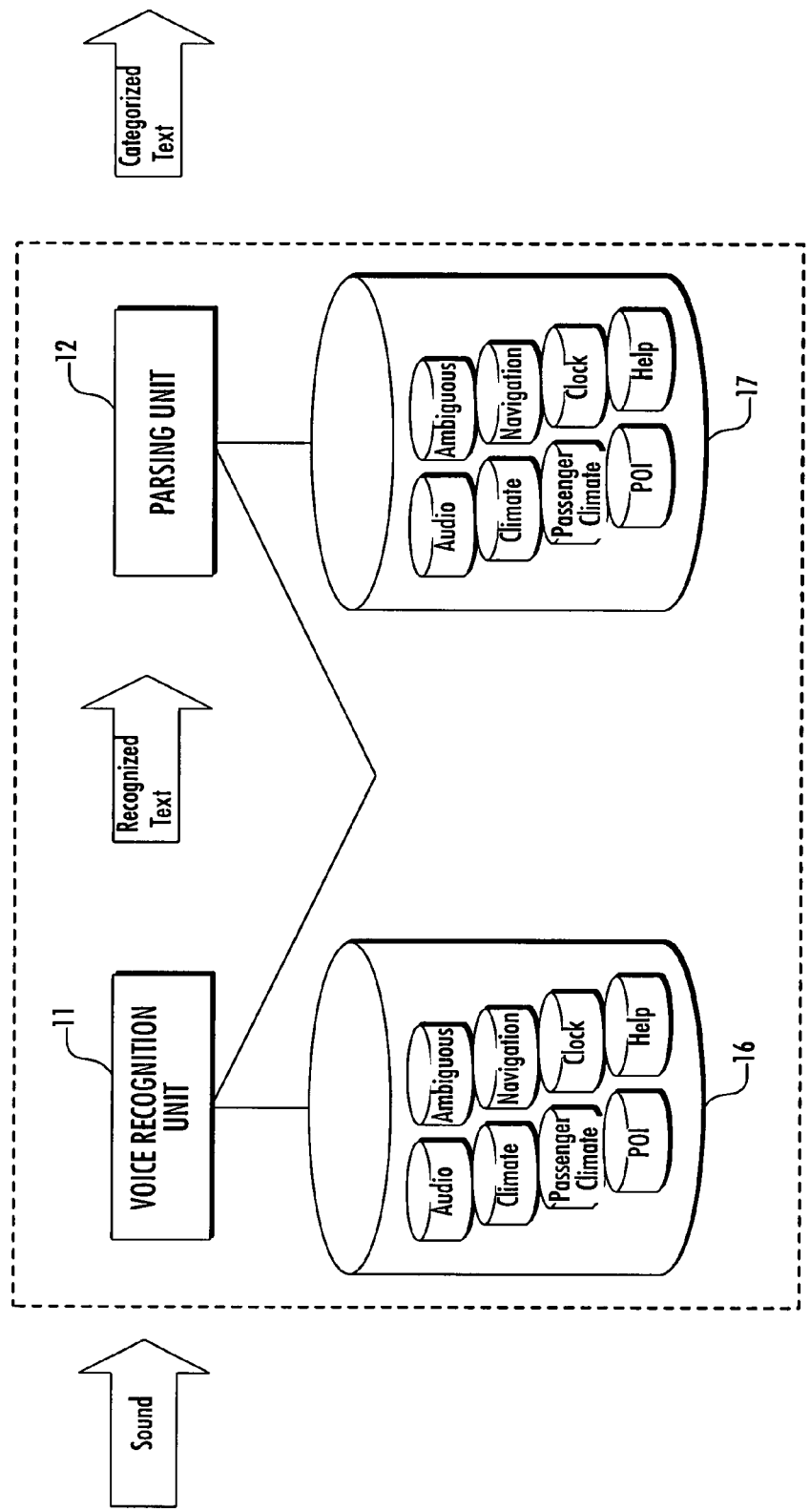
FIG. 2 is a diagram illustrating the configurations of a language model and a parser model in the voice recognition device in FIG. 1.

As shown in FIG. 2, the language model 16 and the parser model 17 each have data categorized into domain types. In the example shown in FIG. 2, the domain types are the following eight types: {Audio, Climate, Passenger Climate, POI, Ambiguous, Navigation, Clock, Help}. {Audio} indicates that the control object is the audio system 6a. {Climate} indicates that the control object is the air conditioner 6c. {Passenger Climate} indicates that the control object is the air conditioner 6c at the passenger seat. {POI} indicates that the control object is the POI search function of the navigation system 6b. {Navigation} indicates that the control object is the function of route guidance or map operation of the navigation system 6b. {Clock} indicates that the control object is the clock function. {Help} indicates that the control object is the help function for checking the operating method of any of the apparatuses 6a-6c or the voice recognition device. Further, {Ambiguous} indicates that the control object is not clear.

Figure 3:
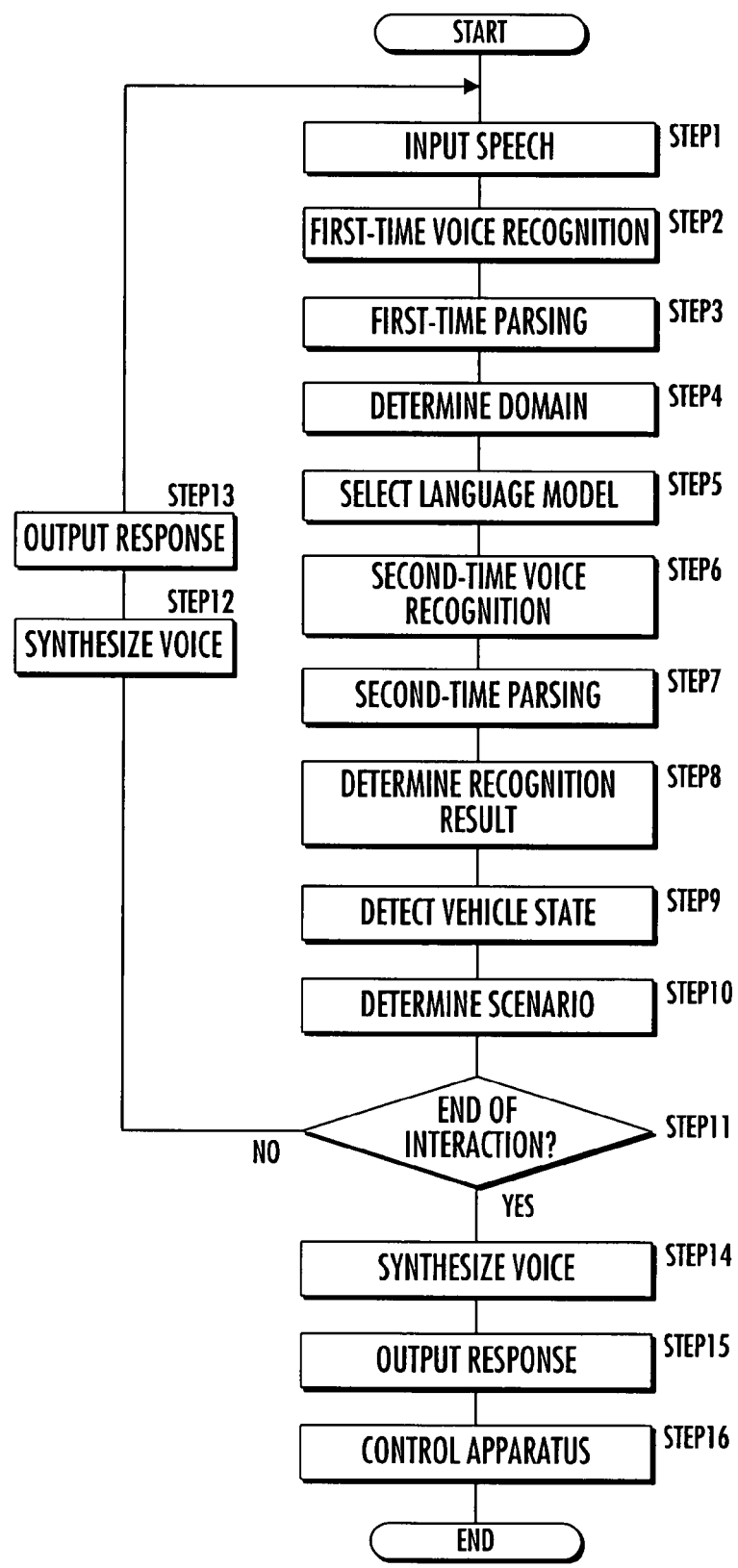
FIG. 3 is a flowchart showing an overall operation (voice interaction processing) by the voice recognition device in FIG. 1.

Hereinafter, an operation (voice interaction processing) of the voice recognition device according to the present embodiment will be described. As shown in FIG. 3, firstly, in STEP 1, a speech for controlling an object is input to the microphone 2 from a driver of the vehicle 10. Specifically, the driver turns ON the talk switch to instruct initiation of input of the speech, and inputs the voice to the microphone 2.

Next, in STEP 2, the voice interaction unit 1 carries out voice recognition processing to recognize the input voice and output the same as a text (this processing is referred to as "first-time voice recognition processing"). It is noted that the first-time voice recognition processing constitutes the processing performed by the first voice recognition processing unit of the present invention.

The voice interaction unit 1 firstly A/D converts the voice input to the microphone 2 to obtain waveform data indicating the voice. Next, the voice interaction unit 1 subjects the waveform data indicating the voice to frequency analysis, to extract a feature vector. As such, the waveform data indicating the voice is subjected to the filtering processing by a method of short-time spectrum analysis, for example, and converted into a time series of feature vectors. The feature vector is an extract of a feature value of the sound spectrum at a time point, which is generally from 10 dimensions to 100 dimensions (39 dimensions for example), and a linear predictive coding (LPC) mel cepstrum coefficient is used, for example.

Next, for the extracted feature vector, the voice interaction unit 1 evaluates the likelihood (sound score AS) of the feature vector for each of the plurality of HMMs recorded in the acoustic model 15 (sound score calculation processing). The voice interaction unit 1 then determines the phonetic data corresponding to the HMM having a high sound score AS from among the plurality of HMMs. In this manner, when the input speech is "Chitose" for example, the phonetic data of "ti-to-se" is obtained from the waveform data of the voice, together with its sound score AS. At this time, for example when the input speech is "mark set", not only the phonetic data of "ma-a-ku-se-t-to" but also the phonetic data having a high degree of similarity acoustically, such as "ma-a-ku-ri-su-to", are obtained together with their sound scores AS. It is noted that the "mark set" indicates the function in the navigation system 6b to allow the driver to register a point of destination or the like, and the "mark list", corresponding to "ma-a-ku-ri-su-to", indicates the function in the navigation system 6b to display a list of pre-registered points of destinations on a display to allow the driver to select from among them.

Next, the voice interaction unit 1 uses the entire data in the language model 16 to determine a text expressed in a word sequence from the determined phonetic data, based on a language score $LS_1$ of the text. At this time, when a plurality of pieces of phonetic data have been determined, texts are determined for respective ones of the phonetic data.

Specifically, the voice interaction unit 1 firstly compares the determined phonetic data with the phonetic data recorded in the language model 16 to extract a word having a high degree of similarity. Next, the voice interaction unit 1 calculates the language score $LS_1$ of the extracted word using the N-grams corresponding to the number of words included in the phonetic data (language score calculation processing). The voice interaction unit 1 then determines, for each word in the phonetic data, a text having the calculated language score $LS_1$ fulfilling a prescribed condition (for example, not less than a prescribed value).

For example, in the case where the input speech is "Set the station ninety nine point three FM.", a text candidate 1: "set the station ninety nine point three FM" shown in FIG. 4 and a text candidate 2: "set the station nearly ninth place" shown in FIG. 5 are determined as the texts corresponding to the phonetic data determined from the speech.

Figure 4:
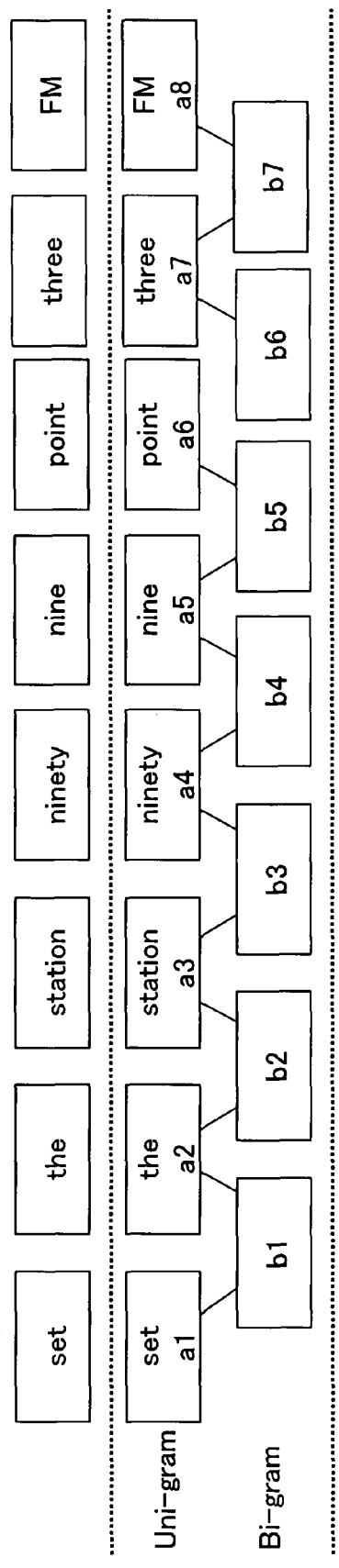
FIG. 4 is a diagram illustrating a text candidate in voice recognition processing using a language model in the voice interaction processing in FIG. 3.

At this time, as shown in FIG. 4, for the text candidate 1, appearance probabilities a1-a8 of the respective words "set", "the", . . . , "FM" are provided in the uni-gram. Further, occurrence probabilities b1-b7 of the respective two-word sequences "set the", "the station", . . . , "three FM" are provided in the bi-gram. For example, the language score $LS_1$ of the word "ninety" included in the text candidate 1 is provided based on a4 and b3. Similarly, for N=3 to 8, occurrence probabilities of N-word sequences, c1-c6, d1-d5, e1-e4, f1-f3, g1-g2, and h1, are provided. For example, the language score $LS_1$ of the text "ninety" included in the text candidate 1 is calculated based on a4, b3, c2 and d1 obtained from the N-grams of N=1 to 4, in accordance with the number of words, four, which is the sum of the word "ninety" and the preceding three words included in the phonetic data.

Figure 5:
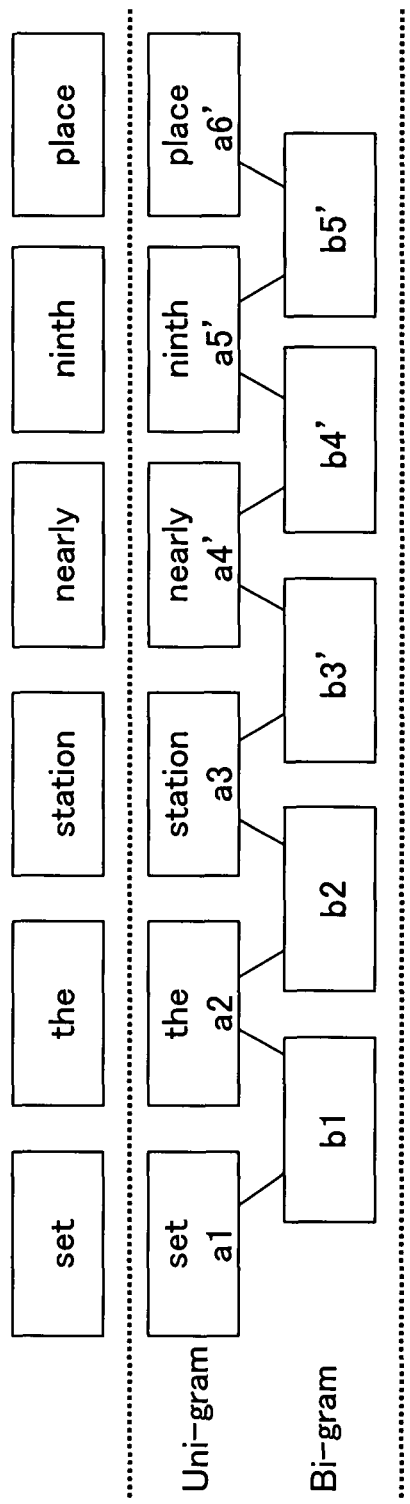
FIG. 5 is a diagram illustrating another text candidate in the voice recognition processing using the language model in the voice interaction processing in FIG. 3.

Further, as shown in FIG. 5, for the text candidate 2, appearance probabilities a1-a3, a4'-a6' of the respective words "set", "the", . . . , "place" are provided in the uni-gram. Further, occurrence probabilities b1-b2, b3'-b5' of the respective two-word sequences "set the", "the station", "ninth place" are provided in the bi-gram. Similarly, for N=3 to 6, occurrence probabilities of N-word sequences, c1, c2'-c4, d1'-d3, e1'-e2', and f1', are provided. The language score $LS_1$ of, e.g., the text "nearly" included in the text candidate 2 is calculated based on a4', b3', c2' and d1' obtained from the N-grams of N=1 to 4, in accordance with the number of words, four, which is the sum of the word "nearly" and the three preceding words included in the phonetic data.

Next, the voice interaction unit 1 calculates, for every one of the determined texts, a confidence factor of voice recognition (voice recognition score $LDD_1$) based on the sound score AS and the language score $LS_1$. Specifically, the voice interaction unit 1 firstly multiplies the sound score AS and the language score $LS_1$ by first weighting factors $W\alpha_1$ and $W\beta_1$, respectively (i.e., assigns weights with a first ratio $W\alpha_1/W\beta_1$). It is noted that for the first weighting factors $W\alpha_1$ and $W\beta_1$, values predetermined experimentally, for example, are used (e.g., $W\alpha_1=W\beta_1=1$). Then, using the obtained scores $W\alpha_1 \times AS$ and $W\beta_1 \times LS_1$, the voice recognition score $LDD_1$ is calculated as the weighted sum of the sound score AS and the language score $LS_1$: $LDD_1=W\alpha_1 \times AS+W\beta_1 \times LS_1$.

Next, the voice interaction unit 1 determines and outputs the text expressed by the word sequence having the calculated voice recognition score $LDD_1$ fulfilling a prescribed condition, as a recognized text. The prescribed condition is predetermined, e.g., to be: the text having the highest voice recognition score $LDD_1$; the texts having the voice recognition scores $LDD_1$ down to a prescribed order from the top; or the texts having the voice recognition scores $LDD_1$ of not less than a prescribed value. The use of such a method of dictating the input speech as a text using a probability and statistical language model for each word enables recognition of a spontaneous speech of the driver, not restricted to the speeches including predetermined expressions.

Figure 6:
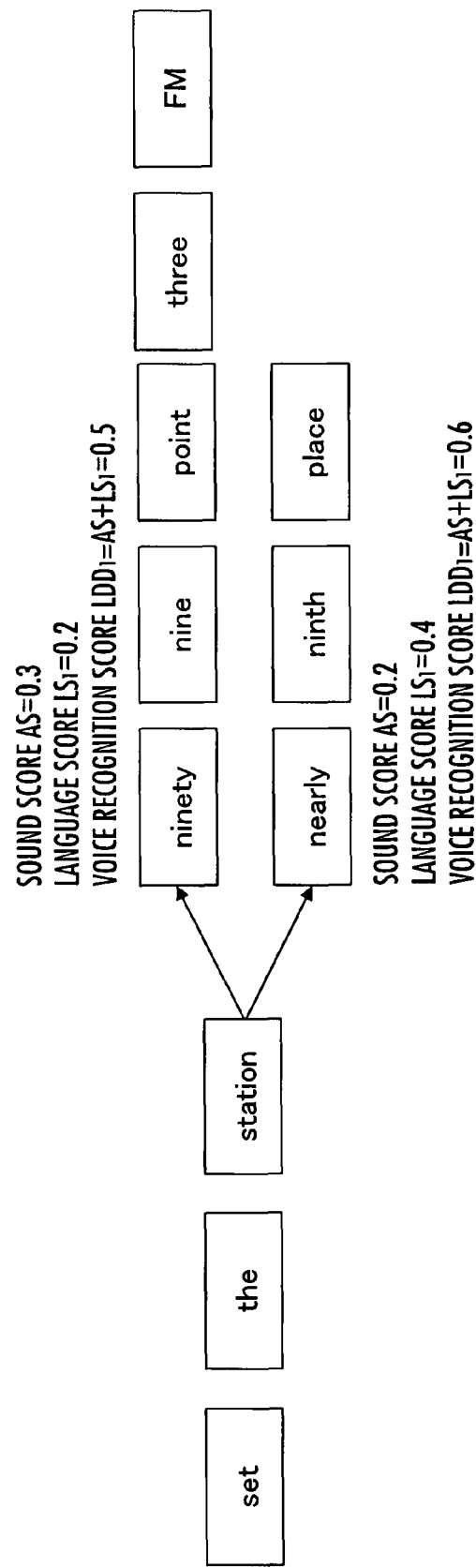
FIG. 6 is a diagram illustrating processing of determining a text in the voice recognition processing using the language model in the voice interaction processing in FIG. 3.

For example, in the case where the input speech is "Set the station ninety nine point three FM.", the text candidates as shown in FIGS. 4 and 5 mentioned above are obtained. Then, as shown in FIG. 6, for respective words in the phonetic data, "set", "the", and "station" are determined successively from the beginning of the phonetic data. Then, "ninety" and "nearly" are provided as the text candidates for the word following "station".

At this time, the phonetic data of "ninety" and "nearly" have a high degree of similarity therebetween, while the difference in sound score AS is small. For the entire language model 16, the appearance probability of "nearly" and the occurrence probability of "station nearly" are higher than the appearance probability of "ninety" and the occurrence probability of "station ninety", and the language score $LS_1$ is higher for "nearly". In the example shown in FIG. 6, the sound score AS, the language score $LS_1$ and the voice recognition score $LDD_1$ for "ninety" are 0.3, 0.2 and 0.5, respectively. For "nearly", the sound score AS, the language score $LS_1$ and the voice recognition score $LDD_1$ are 0.2, 0.4 and 0.6, respectively.

As such, the voice recognition score $LDD_1$ is higher for "nearly", and thus, when the text having the highest voice recognition score $LDD_1$ is to be output, "nearly" is determined to be the recognized text. And "ninth" is determined to be the text for the word following "nearly", and "place" is determined to be the text for the word following "ninth".

As described above, when the same word is used in a plurality of domains, there is a high possibility of recognition error for the word(s) following the common word. In the case of FIG. 6, the word "station" indicates a "broadcasting station" in the radio as the audio system 6a, while it indicates a "railroad station" in the POI search or route guidance function in the navigation system 6b, resulting in a high possibility of recognition error.

Next, in STEP 3, the voice interaction unit 1 carries out parsing processing to understand the meaning of the speech based on the recognized text(s) (this processing is referred to as "first-time parsing processing"). Based on the result of the first-time parsing processing, the domain type of the input speech is determined from the recognized text(s). It is noted that the first-time parsing processing constitutes the processing performed by the first voice recognition processing unit of the present invention.

Specifically, the voice interaction unit 1 firstly uses the data of the entire parser model 17 to calculate, for each word included in the recognized text, the likelihood of a respective domain for one word. Similarly, the voice interaction unit 1 calculates, for a respective two-word sequence included in the recognized text, the likelihood of a respective domain for the two-word sequence in the bi-gram. Similarly, the voice interaction unit 1 calculates, for a respective three-word sequence included in the recognized text, the likelihood of a respective domain for the three-word sequence in the tri-gram. Then, the voice interaction unit 1 calculates the likelihood of a respective domain for the entire recognized text, based on the likelihoods of the respective domains for the one words, two-word sequences, and three-word sequences.

Next, in STEP 4, the voice interaction unit 1 carries out processing of determining the domain type representing a control object (domain type determination processing) based on the result of the first-time parsing processing. This processing constitutes the processing performed by the first voice recognition processing unit. Specifically, based on the likelihoods of the respective domains for the entire text calculated in STEP 3, the voice interaction unit 1 determines the domain having the highest likelihood for the entire text, for example, as the domain of the recognized text. The processing in STEP 3 and STEP 4 will be described later in detail. With this processing, when the recognized text is "set the station nearly ninth place" as shown in FIG. 6 mentioned above, the domain type is determined to be {Audio}.

Next, in STEP 5, the voice interaction unit 1 selectively renders data of the language model 16 effective in accordance with the domain type determined in STEP 4. More specifically, the voice interaction unit 1 makes only a part of the data in the language model 16 categorized into the domain of the type determined in STEP 4 effective. When the recognized text is "set the station nearly ninth place" as shown in FIG. 6 as described above, the data in the {Audio} domain is rendered effective in the language model 16.

Next, in STEP 6, the voice interaction unit 1 carries out voice recognition processing to recognize and output the input voice as a text (this processing is referred to as "second-time voice recognition processing"). It is noted that the second-time voice recognition processing constitutes the processing performed by the second voice recognition processing unit of the present invention.

Firstly, the voice interaction unit 1 uses the part of the data in the language model 16 made effective in STEP 5 to determine a text expressed in a word sequence from the phonetic data determined in STEP 2, based on a language score $LS_2$ of the text. More specifically, firstly, the voice interaction unit 1 compares the determined phonetic data with the phonetic data recorded in the effective data in the language model 16, to extract a word having a high degree of similarity. Next, the voice interaction unit 1 calculates the language score $LS_2$ of the extracted word, similarly as in STEP 2, using the N-grams according to the number of words included in the phonetic data. The voice interaction unit 1 then determines the text(s), for each word in the phonetic data, having the calculated language score $LS_2$ fulfilling a prescribed condition (for example, not less than a prescribed value).

Next, the voice interaction unit 1 calculates a confidence factor of voice recognition (voice recognition score) $LDD_2$ for every one of the determined texts, based on the sound score AS and the language score $LS_2$. Specifically, the voice interaction unit 1 firstly multiplies the sound score AS and the language score $LS_2$ by second weighting factors $W\alpha_2$ and $W\beta_2$, respectively (i.e., assigns weights with a second ratio $W\alpha_2/W\beta_2$). At this time, values of the second weighting factors $W\alpha_2$ and $W\beta_2$ are selected such that the weight on the sound score AS is greater in the second ratio than in the first ratio. For example, the second weighting factors $W\alpha_2$ and $W\beta_2$ are set as follows: $W\alpha_2=k\times W\alpha_1$, $W\beta_2=W\beta_1$ (k>1, for example k=3). Then, using the obtained scores $W\alpha_2\times AS$ and $W\beta_2\times LS_2$, the voice recognition score $LDD_2$ is calculated as the weighted sum of the sound score AS and the language score $LS_2$: $LDD_2=W\alpha_2\times AS+W\beta_2\times LS_2$. In this manner, the voice recognition score $LDD_2$ more reflecting the acoustic feature is obtained.

Next, the voice interaction unit 1 determines and outputs the text expressed by the word sequence having the calculated voice recognition score $LDD_2$ fulfilling a prescribed condition, as the recognized text. The prescribed condition is predetermined, e.g., to be: the text having the highest voice recognition score $LDD_2$; the texts having the voice recognition scores $LDD_2$ down to a prescribed order from the top; or the texts having the voice recognition scores $LDD_2$ of not less than a prescribed value.

For example, when the input speech is "Set the station ninety nine point three FM.", for respective words in the phonetic data, "set", "the" and "station" are determined successively from the beginning of the phonetic data, as shown in FIG. 6. Then, "ninety" and "nearly" are provided as the text candidates corresponding to the word following "station".

In the second-time voice recognition processing, the language model 16 is restricted to the {Audio} domain. In the {Audio} domain, the appearance probability of "ninety" and the occurrence probability of "station ninety" are higher than the appearance probability of "nearly" and the occurrence probability of "station nearly", and the language score $LS_2$ is higher for "ninety". Further, in the second-time voice recognition processing, the weight on the sound score AS is increased. Thus, the voice recognition score $LDD_2$ is higher for "ninety", and accordingly, when outputting the text having the highest voice recognition score $LDD_2$ for example, "ninety" is determined to be the recognized text, and "nine", "point", "three", and "FM" are determined successively as the texts corresponding to the words following "ninety". That is, since the domain type is determined accurately in STEP 4 based on the meaning of the entire text recognized from the speech in STEP 3, and since the language model 16 is selected appropriately in STEP 5, the possibility that the text of "ninety" is recognized increases in the second-time voice recognition processing.

Further, for example when the speech of "mark set" is input in STEP 1, a part of the data in the language model 16 categorized into the {Navigation} domain is selectively rendered effective through the processing in STEPS 2-5. As such, in the second-time voice recognition processing in STEP 6, the possibility of recognition error that the speech of "mark set" is erroneously recognized as the words registered in the domains other than the {Navigation} domain is reduced. In addition, in the second-time voice recognition processing, the acoustic feature is considered in more detail, so that the possibility that the speech of "mark set" is erroneously recognized as "mark list" included in the same {Navigation} domain and somewhat similar in the acoustic feature is reduced.

Next, in STEP 7, the voice interaction unit 1 carries out parsing processing to understand the meaning of the speech from the recognized text (this processing is referred to as "second-time parsing processing"). Based on the result of the second-time parsing processing, a categorized text is determined from the recognized text. It is noted that the second-time parsing processing constitutes the processing performed by the second voice recognition processing unit of the present invention.

Specifically, the voice interaction unit 1 firstly uses the data of the entire parser model 17 to calculate, for each word included in the recognized text, the likelihood of a respective domain for one word. Next, the voice interaction unit 1 determines a domain for the one word based on the likelihood. Next, the voice interaction unit 1 uses a part of the data in the parser model 17 categorized into the domain of the determined type, to calculate the likelihood (word score) of a respective class set (categorized text) for one word. The voice interaction unit 1 then determines a categorized text for the one word, based on the word score.

Similarly, for each two-word sequence included in the recognized text, the voice interaction unit 1 calculates the likelihood of a respective domain for the two-word sequence, and determines a domain for the two-word sequence based on the likelihood. Further, the voice interaction unit 1 calculates the likelihood (two-word score) of a respective class set for a two-word sequence, and determines a class set (categorized text) for the two-word sequence based on the two-word score. Further, similarly, for each three-word sequence included in the recognized text, the voice interaction unit 1 calculates the likelihood of a respective domain for the three-word sequence, and determines a domain for the three-word sequence based on the likelihood. Further, the voice interaction unit 1 calculates the likelihood (three-word score) of a respective class set for a three-word sequence, and determines a class set (categorized text) for the three-word sequence based on the three-word score.

Next, the voice interaction unit 1 calculates the likelihood (parsing score) of a respective class set for the entire recognized text, based on the class sets determined for one word, two-word sequence, and three-word sequence, and the scores (one-word score, two-word score, three-word score) of the class sets. The voice interaction unit 1 then determines the class set (categorized text) for the entire recognized text, based on the parsing score.

Figure 7:
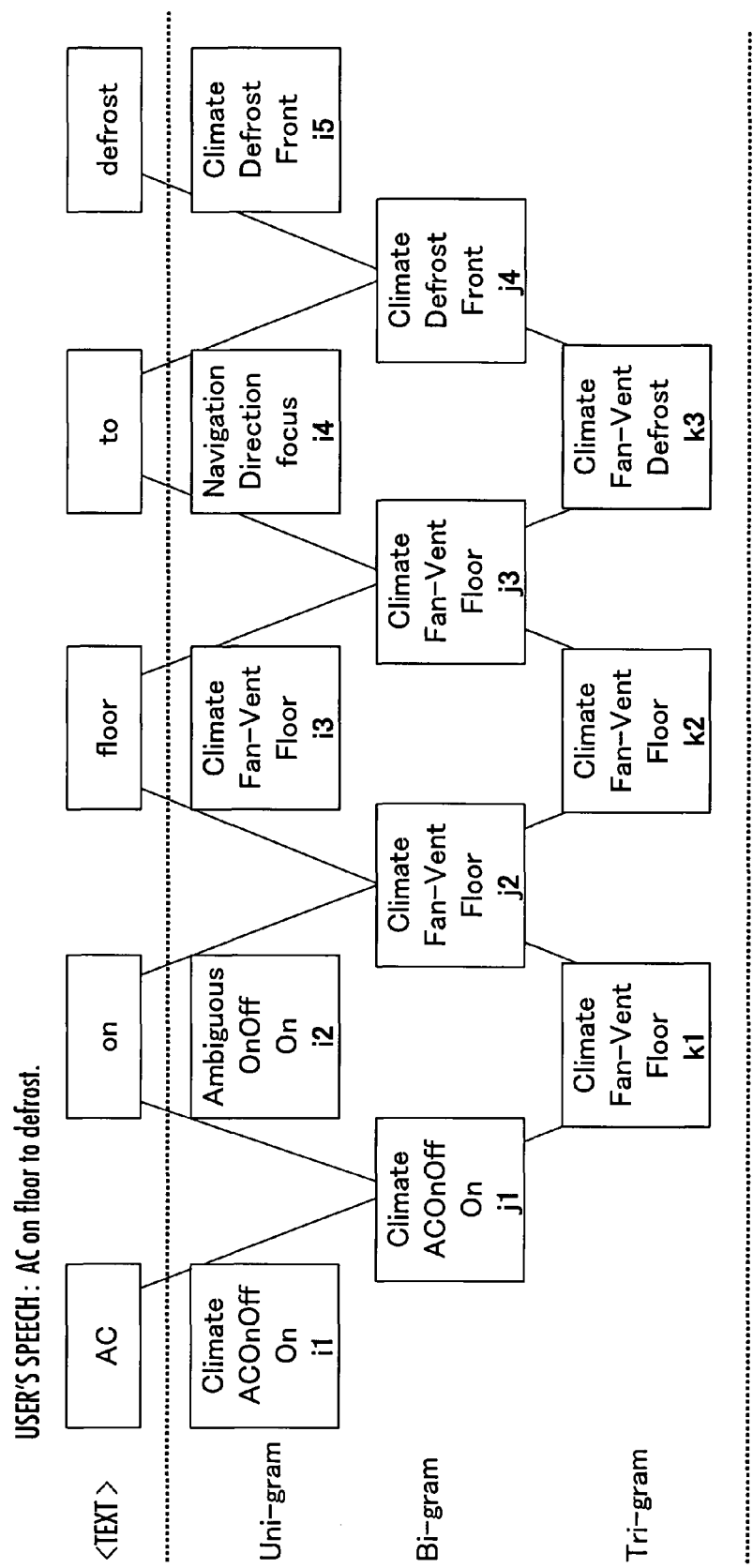
FIG. 7 is a diagram illustrating parsing processing using a parser model in the voice interaction processing in FIG. 3.

Here, the processing of determining a categorized text using the parser model 17 will be described with reference to the example shown in FIG. 7. In the example in FIG. 7, the recognized text is "AC on floor to defrost".

At this time, the entire parser model 17 is used to calculate the likelihood of a respective domain for one word, for each of the words "AC", "on", . . . , "defrost", in the uni-gram. Then, the domain for the one word is determined based on the likelihood. For example, the domain of the first place (having the highest likelihood) is {Climate} for "AC", {Ambiguous} for "on", and {Climate} for "defrost".

Further, using the part of the data in the parser model 17 categorized into the determined domain type, the likelihood of a respective class set for one word is calculated in the uni-gram, for "AC", "on", . . . , "defrost". Then, the class set for the one word is determined based on the likelihood. For example, for "AC", the class set of the first place (having the highest likelihood) is determined to be {Climate_ACOnOff_On}, and the likelihood (word score) i1 for this class set is obtained. Similarly, the class sets are determined for "on", . . . , "defrost", and the likelihoods (word scores) i2-i5 for the respective class sets are obtained.

Similarly, the likelihood of a respective domain for a two-word sequence is calculated in the bi-gram, for each of "AC on", "on floor", . . . , "to defrost", and the domain for the two-word sequence is determined based on the likelihood. Then, the class sets for the respective two-word sequences and their likelihoods (two-word scores) j1-j4 are determined. Further, similarly, the likelihood of a respective domain for a three-word sequence is calculated in the tri-gram, for each of "AC on floor", "on floor to", and "floor to defrost", and the domain for the three-word sequence is determined based on the likelihood. Then, the class sets for the respective three-word sequences and their likelihoods (three-word scores) k1-k3 are determined.

Next, for each of the class sets determined for one word, two-word sequence and three-word sequence, a sum of the word score(s) i1-i5, the two-word score(s) j1-j4, and the three-word score(s) k1-k3 for the corresponding class set is calculated as the likelihood (parsing score) of the class set for the entire text. For example, the parsing score for {Climate_Fan-Vent_Floor} is i3+j2+j3+k1+k2. Further, the parsing score for {Climate_ACOnOff_On} is i1+j1, and the parsing score for {Climate_Defrost_Front} is i5+j4. Then, the class sets (categorized texts) for the entire text are determined based on the calculated parsing scores. In this manner, the categorized texts such as {Climate_Defrost_Front}, {Climate_Fan-Vent_Floor}, and {Climate_ACOnOff_On} are determined from the recognized text.

Next, in STEP 8, the voice interaction unit 1 determines any categorized text having the calculated parsing score fulfilling a prescribed condition as a recognition result of the input speech, and outputs the same together with the confidence factor (parsing score) of the recognition result. The prescribed condition is predetermined, e.g., to be: the text having the highest parsing score; the texts having the parsing scores down to a prescribed order from the top; or the texts having the parsing scores of not less than a prescribed value. For example, in the case where the input speech is "AC on floor to defrost" as described above, {Climate_Defrost_Front} is output as a recognition result, together with the confidence factor (parsing score) of the recognition result.

Next, in STEP 9, the voice interaction unit 1 obtains a detection value of the state of the vehicle 10 (running condition of the vehicle 10, the state of the apparatus mounted to the vehicle 10, state of the driver of the vehicle 10 or the like) detected by the vehicle state detection unit 3.

Next, in STEP 10, the voice interaction unit 1 uses the scenario database 18 to determine a scenario for output of a response to the driver or for apparatus control, based on the recognition result of the speech output in STEP 8 and the state of the vehicle 10 detected in STEP 9.

Figure 8:
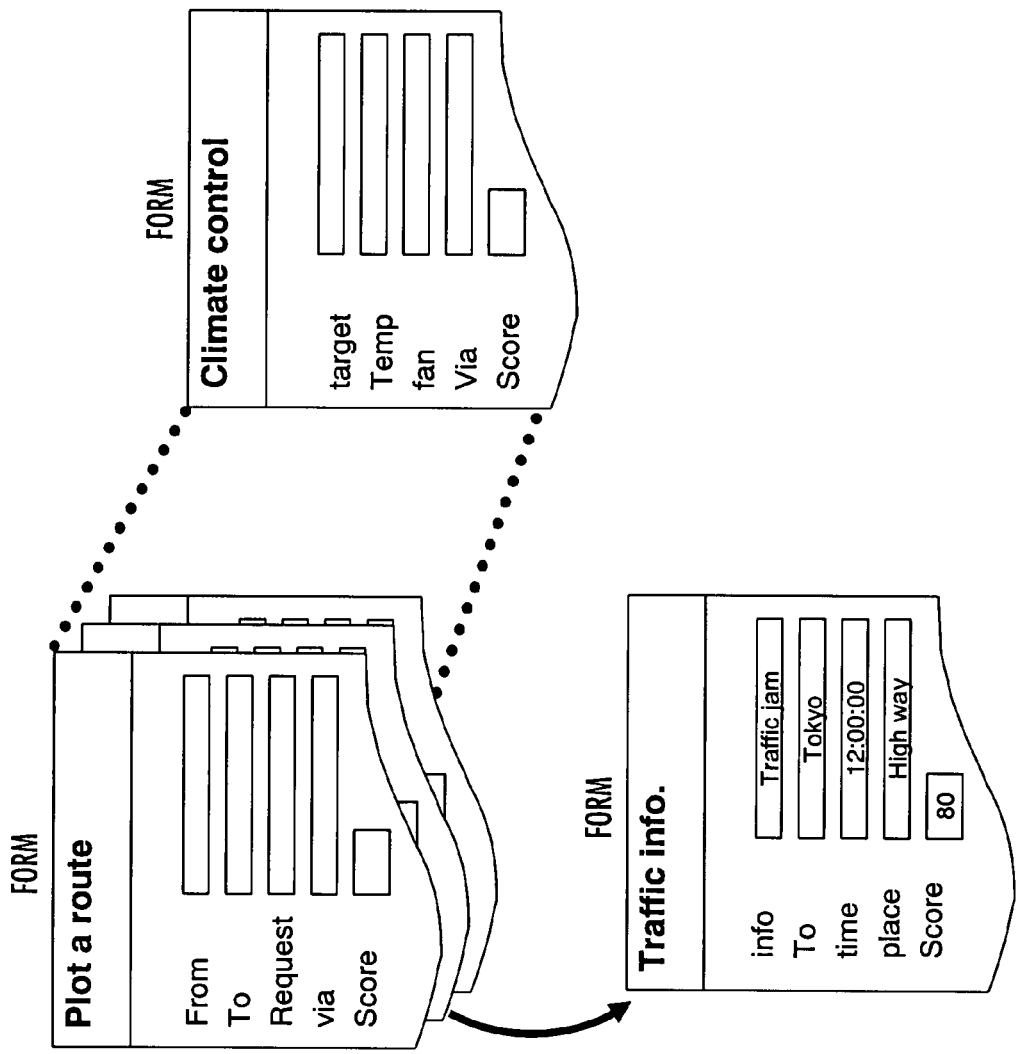
FIG. 8 is a diagram illustrating forms for use in processing of determining a scenario in the voice interaction processing in FIG. 3.

Specifically, the voice interaction unit 1 firstly obtains information for controlling an object, from the recognition result of the speech and the state of the vehicle 10. As shown in FIG. 8, the voice interaction unit 1 is provided with a plurality of forms storing information for controlling an object. Each form has a prescribed number of slots corresponding to the class of the necessary information. For example, the forms of "Plot a route", "Traffic info." and others are provided for storing the information for controlling the navigation system 6b, and the forms of "Climate control" and others are provided for storing the information for controlling the air conditioner 6c. The form "Plot a route" is provided with four slots of "From", "To", "Request", and "via".

The voice interaction unit 1 inputs values into the slots of the corresponding form, based on the recognition result of the speech of each time in the interaction with the driver and the state of the vehicle 10. In addition, it calculates the confidence factor for each form (degree of confidence of the values input to the form), and records the same on the form. The confidence factor of the form is calculated based, e.g., on the confidence factor of the recognition result of the speech of each time, and the filled-in degree of the slots of the form. For example, as shown in FIG. 9, when the speech input from the driver is "Guide me to Chitose Airport via shortest route", the three slots of "From", "To", and "Request" of the form "Plot a route" are filled with the values "here", "Chitose Airport", and "shortest", respectively. Further, the confidence factor of the form, calculated as 80, is recorded on "Score" in the form "Plot a route".

Next, the voice interaction unit 1 selects the form to be used for the actual control processing, based on the confidence factor of the form and the state of the vehicle 10 detected in STEP 9. It then determines a scenario, based on the selected form, using the data stored in the scenario database 18. As shown in FIG. 9, the scenario database 18 stores, e.g., response sentences to be output to the driver, which are categorized according to the filled-in degrees of the slots and levels. It is noted that the "level" refers to a value that is set based, e.g., on the confidence factor of the form and the state of the vehicle 10 (running condition of the vehicle 10, state of the driver, or the like).

For example, in the case where there is any available slot (not filled with a value) in the selected form, the scenario to output a response sentence to prompt the driver to input the available slot in the form is determined. At this time, an appropriate response sentence for prompting next speech of the driver is determined in accordance with the level, i.e., in consideration of the confidence factor of the form and the state of the vehicle 10. For example, when driving load is considered to be high according to the driver's driving load, a response sentence in which the number of slots to which input is prompted is set smaller is determined. Prompting the user's next speech by outputting the response sentence determined in this manner ensures efficient interaction.

In the example shown in FIG. 9, the form "Plot a route" has the first through third slots "From", "To" and "Request" having the values input therein, and the fourth slot "via" having no value input therein. The level is set to "2" based on the confidence factor of the form (=80) and the state of the vehicle 10. At this time, the response sentence: "Route to <To> is set in consideration of <Request>" is selected from the scenario database 18, and the response sentence: "Route to Chitose Airport is set in consideration of highway priority" is determined.

In the case where all the slots in the selected form are filled in (having the values input therein), a scenario for outputting a response sentence to confirm the contents (for example, a response sentence to inform the driver of the input values in the respective slots) is determined.

Next, in STEP 11, the voice interaction unit 1 determines whether interaction with the driver has been finished, based on the determined scenario. If the decision result in STEP 11 is NO, the process proceeds to STEP 12, and the voice interaction unit 1 synthesizes voice in accordance with the content of the determined response sentence as well as the conditions upon outputting the response sentence. In STEP 13, the generated response sentence is output via the speaker 4.

The process then returns to STEP 1, where the second speech is input from the driver. Then, similarly to the case of the first speech, the processing in STEPS 2-10 are carried out, and in STEP 11, it is determined whether interaction with the driver has been finished. If the decision result in STEP 11 is NO, as in the case of the first speech, the process proceeds to STEP 12, where voice is synthesized for the determined response sentence, and the generated response sentence is output from the speaker 4 in STEP 13.

Thereafter, processing identical to those in STEPS 1-10, 12 and 13 for the second speech are repeated until the decision result in STEP 11 becomes YES.

If the decision result in STEP 11 is YES, the process proceeds to STEP 14, where the voice interaction unit 1 synthesizes voice of the determined response sentence. Then, in STEP 15, the response sentence is output from the speaker 4. Next, in STEP 16, the voice interaction unit 1 controls the apparatus based on the determined scenario, and the voice interaction processing is terminated.

Hereinafter, the processing of determining the domain type (corresponding to the STEPS 3 and 4 described above) will be described with reference to FIG. 10. FIG. 10 shows the case where the recognized text is "set the station nearly ninth place".

In STEP 3, the voice interaction unit 1 firstly counts, for each word included in the recognized text, the number of the relevant word registered in the data of a respective domain in the language model 16, and divides the count value by the total number of words registered in the data of the corresponding domain in the language model 16, to thereby calculate the registration frequency of the one word in the domain. Thus, as shown in the table in FIG. 10(a), the registration frequencies of a respective word for the respective domains are obtained. For example, the registration frequency of the word "set" in the {Audio} domain, shown by hatching in FIG. 10(a), corresponds to: [the number of "set" registered in the {Audio} domain]/[the total number of words registered in the {Audio} domain]. Assuming that the number of "set" registered in the {Audio} domain is 10 and the total number of words registered in the {Audio} domain is 100, the registration frequency is calculated as: 10/100=0.1.

Similarly, the voice interaction unit 1 counts, for a respective two-word sequence included in the recognized text, the number of the relevant two-word sequence registered in the data of a respective domain in the language model 16, and divides the count value by the total number of words registered in the data of the corresponding domain in the language model 16, to thereby calculate the registration frequency of each two-word sequence in each domain. In this manner, as shown in the table in FIG. 10(*b*), the registration frequencies of respective two-word sequences for the respective domains are obtained.

Similarly, the voice interaction unit 1 counts, for a respective three-word sequence included in the recognized text, the number of the relevant three-word sequence registered in the data of a respective domain in the language model 16, and divides the count value by the total number of words registered in the data of the corresponding domain in the language model 16, to thereby calculate the registration frequency of each three-word sequence in each domain. In this manner, as shown in the table in FIG. 10(*c*), the registration frequencies of respective three-word sequences for the respective domains are obtained.

Next, the voice interaction unit 1 calculates the likelihood of a respective domain for the entire recognized text (parsing score for domain determination) based on the registration frequencies of the one words, two-word sequences, and three-word sequences for the respective domains. More specifically, it obtains a sum of the registration frequencies for a respective domain, and uses the sum as a score of the corresponding domain. In this manner, as shown in the table in FIG. 10(*d*), the scores are calculated for the respective domains.

Next, in STEP 4, the voice interaction unit 1 determines, based on the parsing scores for domain determination calculated in STEP 3, the domain having its score fulfilling a prescribed condition, for example, the highest score or the like, as the domain of the recognized text. In the example shown in FIG. 10(*d*), the score of the {Audio} domain is 2.99, which is the highest, so that the domain type is determined to be {Audio}.

The parsing processing is carried out in the above-described manner, using the registration frequencies of the respective words and word sequences (one words, two-word sequences, three-word sequences) included in the recognized text, and accordingly, the meaning of the entire text is understood in consideration of the context of the text (sentence). The meaning of the entire text indicates general tendency of the driver's speech, reflecting the driver's intention. Thus, the domain type of the driver's speech can be determined with accuracy based on the result of analysis of the registration frequencies of the word sequences included in the text. In the example shown in FIG. 10, the registration frequency of the word "station" and the registration frequency of the word sequence such as "set the station" are both used. The registration frequency of the word sequence "set the station" is high for the {Audio} domain, and thus, the domain type of the driver's speech is determined to be {Audio}.

The processing of determining the domain type has been described above in detail. In accordance with the domain type thus determined, it is possible to selectively render the language model 16 effective as appropriate in STEP 5, which improves the recognition accuracy of the text in the second-time voice recognition processing in STEP 6. This ensures that the recognition results determined in STEP 8 based on the results of the second-time parsing processing in STEP 7 will very likely include a recognition result matching the driver's speech. Accordingly, in STEP 10, it is possible to determine a scenario in accordance with the driver's intention.

Therefore, according to the present embodiment, the language model 16 is selected appropriately and thus the recognition accuracy of the speech is improved, so that the apparatus is controlled through efficient interaction.

Second Embodiment

Hereinafter, a voice recognition device according to a second embodiment of the present invention will be described. The present embodiment differs from the first embodiment only by the processing of determining the domain type (corresponding to the STEPS 3 and 4 described above) in the voice interaction processing. Since the configuration of the present embodiment is identical to that of the first embodiment, the like parts are denoted by the like reference characters, and description thereof will not be repeated.

The processing of determining the domain type in the voice interaction processing in the voice recognition device of the present embodiment will be described with reference to FIG. 11. FIG. 11 shows the case where the recognized text is "set the station nearly ninth place", as in the case of FIG. 10.

In STEP 3, similarly as in the first embodiment, for each word included in the recognized text, the number of the relevant word registered in the data of a respective domain in the language model 16 is counted, and the count value is divided by the total number of words registered in the data of the corresponding domain in the language model 16, to thereby calculate the registration frequency of each word in each domain. Then, for a respective word, the domain having the highest registration frequency is extracted. Thus, as shown in the table in FIG. 11(*a*), the registration frequency of a respective word for the extracted domain is obtained.

Similarly, for a respective two-word sequence included in the recognized text, the voice interaction unit 1 counts the number of the relevant two-word sequence registered in the data of a respective domain in the language model 16, and divides the count value by the total number of words registered in the data of the corresponding domain in the language model 16, to thereby calculate the registration frequency of each two-word sequence in each domain. Then, the domain having the highest registration frequency is extracted for a respective two-word sequence. Accordingly, as shown in the table in FIG. 11(*b*), the registration frequency of a respective two-word sequence for the extracted domain is obtained.

Similarly, for a respective three-word sequence included in the recognized text, the voice interaction unit 1 counts the number of the relevant three-word sequence registered in the data of a respective domain in the language model 16, and divides the count value by the total number of words registered in the data of the corresponding domain in the language model 16, to thereby calculate the registration frequency of each three-word sequence in each domain. It then extracts the domain having the highest registration frequency for a respective three-word sequence. Thus, as shown in the table in FIG. 11(*c*), the registration frequency of a respective three-word sequence for the extracted domain is obtained.

Next, the voice interaction unit 1 calculates, based on the registration frequencies of the one words, two-word sequences and three-word sequences in the respective domains, the likelihood (parsing score for domain determination) of a respective domain for the entire recognized text. More specifically, it obtains a sum of the registration frequencies for each domain, and uses the sum as the score of the corresponding domain. As such, the scores are calculated for the respective domains, as shown in the table in FIG. 11(d).

Next, in STEP 4, the voice interaction unit 1 determines, based on the parsing scores for domain determination calculated in STEP 3, the domain having the score fulfilling a prescribed condition, e.g., the highest score, as the domain of the recognized text. In the example shown in FIG. 11(d), the score of the {Audio} domain is 1.5, which is the highest, so that the domain type is determined to be {Audio}. The remaining operations in the present embodiment are identical to those in the first embodiment.

According to the present embodiment, as in the first embodiment, the language model 16 is selected appropriately and the recognition accuracy of the speech is improved, so that the apparatus is controlled via efficient interaction.

While the first and second embodiments described above each have the vehicle state detection unit 3 and the scenario control unit 13 determines a scenario based on the recognition result of the speech as well as the detected state of the vehicle, the vehicle state detection unit 3 does not necessarily have to be provided, and the scenario control unit 13 may determine the control processing based only on the recognition result of the speech.

Further, while the user inputting the voice is the driver of the vehicle 10 in the first and second embodiments above, a passenger other than the driver may input the voice.

Furthermore, while the voice recognition device is mounted to the vehicle 10 in the first and second embodiments described above, the voice recognition device may be mounted to a mobile unit other than the vehicle. Further, not limited to the mobile unit, the present invention is applicable to any system in which the user controls an object by speech.

What is claimed is:

1. A voice recognition device for determining a control content of a control object based on a recognition result of input voice, comprising:
   a first voice recognition processing unit for executing processing on the input voice by assigning weights of a first ratio to a sound score calculated based on an acoustic feature of the voice and a language score calculated based on a linguistic feature of the voice, obtaining a first recognition score at least based upon the first ratio, the sound score and the language score, and recognizing the voice using the first recognition score in accordance with at least a first predetermined condition, to determine a type of a domain representing the control object based on a result of the processing; and
   a second voice recognition processing unit for executing processing, using the domain of the type determined by the first voice recognition processing unit as a recognition object, by assigning weights of a second ratio to the sound score and the language score calculated for the input voice, the weight on the sound score being greater in the second ratio than in the first ratio, obtaining a second recognition score at least based upon the second ratio, the sound score and the language score, and recognizing the voice using the second recognition score in accordance with at least a second predetermined condition, to determine the control content of the control object based on a result of the processing,
   wherein the first voice recognition processing unit and the second voice recognition processing unit execute the processing of recognizing the voice for the same voice input.

2. The voice recognition device according to claim 1, comprising a control processing unit for executing prescribed control processing based at least on the control content of the control object determined.

3. The voice recognition device according to claim 2, comprising a response output processing unit for outputting a response to a user from which the voice is input, wherein the control processing executed by the control processing unit includes processing of controlling the response to the user to prompt the user to input voice.

4. A voice recognition device including a microphone to which voice is input and a computer having an interface circuit for accessing data of the voice obtained via the microphone, and determining a control content of a control object through processing executed by the computer, based on a recognition result of the voice input to the microphone,
   the computer executing:
   sound score calculation processing of calculating a sound score based on an acoustic feature of the input voice;
   language score calculation processing of calculating a language score based on a linguistic feature of the input voice;
   for the input voice, first voice recognition processing of assigning weights of a first ratio to the sound score calculated in the sound score calculation processing and the language score calculated in the language score calculation processing, obtaining a first recognition score at least based upon the first ratio, the sound score and the language score, and recognizing the voice using the first recognition score in accordance with at least a first predetermined condition;
   domain type determination processing of determining a type of a domain representing the control object based on a recognition result in the first voice recognition processing;
   for the input voice, second voice recognition processing, using the domain of the type determined in the domain type determination processing as a recognition object, of assigning weights of a second ratio to the sound score calculated in the sound score calculation processing and the language score calculated in the language score calculation processing, the weight on the sound score being greater in the second ratio than in the first ratio, obtaining a second recognition score at least based upon the second ratio, the sound score and the language score, and recognizing the voice using the second recognition score in accordance with at least a second predetermined condition; and
   recognition result determination processing of determining the control content of the control object based on a recognition result in the second voice recognition processing,
   wherein the first voice recognition processing and the second voice recognition processing execute the processing of recognizing the voice for the same voice input.

5. A voice recognition method for determining a control content of a control object based on a recognition result of input voice, comprising:
   a first voice recognition step of assigning weights of a first ratio to a sound score calculated based on an acoustic feature of the input voice and a language score calculated based on a linguistic feature of the voice, obtaining a first recognition score at least based upon the first ratio, the sound score and the language score, and recognizing the voice using the first recognition score in accordance with at least a first predetermined condition;

a domain type determination step of determining a type of a domain representing the control object based on a recognition result in the first voice recognition step;

a second voice recognition step, using the domain of the type determined in the domain type determination step as a recognition object, of assigning weights of a second ratio to the sound score and the language score calculated for the input voice, the weight on the sound score being greater in the second ratio than in the first ratio, obtaining a second recognition score at least based upon the second ratio, the sound score and the language score, and recognizing the voice using the second recognition score in accordance with at least a second predetermined condition; and a recognition result determination step of determining the control content of the control object based on a recognition result in the second voice recognition step, wherein the first voice recognition processing step and the second voice recognition processing step execute the processing of recognizing the voice for the same voice input.

6. A non-transitory computer readable medium comprising a voice recognition program causing a computer to execute processing of determining a control content of a control object based on a recognition result of input voice, having a function to cause the computer to execute:

sound score calculation processing of calculating a sound score based on an acoustic feature of the input voice;

language score calculation processing of calculating a language score based on a linguistic feature of the input voice;

for the input voice, first voice recognition processing of assigning weights of a first ratio to the sound score calculated in the sound score calculation processing and the language score calculated in the language score calculation processing, obtaining a first recognition score at least based upon the first ratio, the sound score and the language score, and recognizing the voice using the first recognition score in accordance with at least a first predetermined condition;

domain type determination processing of determining a type of a domain representing the control object based on a recognition result in the first voice recognition processing;

for the input voice, second voice recognition processing, using the domain of the type determined in the domain type determination processing as a recognition object, of assigning weights of a second ratio to the sound score calculated in the sound score calculation processing and the language score calculated in the language score calculation processing, the weight on the sound score being greater in the second ratio than in the first ratio, obtaining a second recognition score at least based upon the second ratio, the sound score and the language score, and recognizing the voice using the second recognition score in accordance with at least a second predetermined condition; and recognition result determination processing of determining the control content of the control object based on a recognition result in the second voice recognition processing, wherein the first voice recognition processing and the second voice recognition processing execute the processing of recognizing the voice for the same voice input.

* * * * *